United States Patent
Arun et al.

(10) Patent No.: US 9,600,143 B2
(45) Date of Patent: Mar. 21, 2017

(54) MOBILE TERMINAL AND CONTROL METHOD THEREOF

(71) Applicant: LG ELECTRONICS INC., Seoul (KR)

(72) Inventors: Kumar M Arun, Bangalore (IN); Sasikala Paruchuri, Bangalore (IN); K Suhail, Bangalore (IN)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 13/916,135

(22) Filed: Jun. 12, 2013

(65) Prior Publication Data

US 2014/0136977 A1 May 15, 2014

(30) Foreign Application Priority Data

Nov. 15, 2012 (KR) .................. 10-2012-0129789

(51) Int. Cl.
*G06F 3/00* (2006.01)
*G06F 3/0482* (2013.01)
*G06F 17/30* (2006.01)

(52) U.S. Cl.
CPC ...... *G06F 3/0482* (2013.01); *G06F 17/30017* (2013.01)

(58) Field of Classification Search
CPC .. G06F 3/0484; G06F 9/44505; G06F 9/4443; G06F 3/04883; G06F 3/0488; G06F 1/1616; G06F 3/0481; G06F 1/1641; G06F 3/1423; G06F 3/0483; G06F 17/30867; G06F 15/0225; G06F 17/30994; G06F 17/30846; G06F 3/04817; G06F 3/0482; G06F 3/04842; G06F 3/04847; G06F 3/04855; G06F 3/0486; H04M 1/72583; H04M 1/72569
USPC .................. 715/765, 716, 727, 864, 810
See application file for complete search history.

(56) References Cited

U.S. PATENT DOCUMENTS

| 8,519,971 | B1* | 8/2013 | Mackraz | G06F 3/147 |
| | | | | 313/504 |
| 8,937,620 | B1* | 1/2015 | Teller | G06T 13/80 |
| | | | | 345/467 |
| 9,007,311 | B2* | 4/2015 | Kwak | G06F 3/0488 |
| | | | | 345/173 |
| 9,044,183 | B1* | 6/2015 | Karam | G06F 17/30846 |
| 2004/0205286 | A1* | 10/2004 | Bryant et al. | 711/1 |
| 2005/0160113 | A1* | 7/2005 | Sipusic | G06F 3/0485 |

(Continued)

OTHER PUBLICATIONS

Sargin et al., Booting video Classification Using Cross-Video Signals; © 2011; IEEE; 4 pages.*

*Primary Examiner* — Linh K Pham
(74) *Attorney, Agent, or Firm* — Birch, Stewart, Kolasch & Birch, LLP

(57) ABSTRACT

A mobile terminal for classifying contents and a control method thereof are provided. The mobile terminal includes: a display unit configured to display a plurality of contents; a touch sensor configured to sense a touch input applied to the display unit; and a controller configured to classify at least one of a plurality of contents selected on the basis of a touch input applied to the display unit into a particular category, and display an object indicating the category of the selected contents in a region adjacent to the selected contents.

10 Claims, 16 Drawing Sheets

(56) References Cited

U.S. PATENT DOCUMENTS

| | | | |
|---|---|---|---|
| 2006/0253875 A1* | 11/2006 | Choi | H04N 5/445 725/62 |
| 2007/0047917 A1* | 3/2007 | Sasaki et al. | 386/96 |
| 2007/0067738 A1* | 3/2007 | Flynt et al. | 715/810 |
| 2007/0143702 A1* | 6/2007 | Maggi | 715/779 |
| 2008/0174570 A1* | 7/2008 | Jobs | G06F 3/0488 345/173 |
| 2009/0316686 A1* | 12/2009 | Mandre | 370/352 |
| 2009/0317060 A1* | 12/2009 | Han | G11B 27/034 386/248 |
| 2010/0077334 A1* | 3/2010 | Yang | G06F 3/0486 715/769 |
| 2010/0325239 A1* | 12/2010 | Khedouri | G06F 17/30094 709/217 |
| 2011/0009051 A1* | 1/2011 | Khedouri | G06F 17/30038 455/3.06 |
| 2011/0060988 A1* | 3/2011 | Mysliwy et al. | 715/702 |
| 2011/0167462 A1* | 7/2011 | O'Connor et al. | 725/110 |
| 2012/0032901 A1* | 2/2012 | Kwon | G06F 3/04883 345/173 |
| 2012/0323349 A9* | 12/2012 | Khedouri | G06F 17/30094 700/94 |
| 2012/0323917 A1* | 12/2012 | Mercer | G06F 17/30056 707/737 |
| 2012/0331386 A1* | 12/2012 | Hicken | G06F 17/30743 715/716 |
| 2013/0022185 A9* | 1/2013 | Khedouri | G06F 17/30094 379/102.03 |
| 2013/0024539 A9* | 1/2013 | Khedouri | G06F 17/30094 709/217 |
| 2013/0097302 A9* | 4/2013 | Khedouri | G06F 17/30094 709/224 |
| 2013/0144871 A1* | 6/2013 | Xia | G06F 17/30817 707/727 |
| 2013/0227414 A1* | 8/2013 | Hwang | G06F 3/0485 715/719 |
| 2013/0227464 A1* | 8/2013 | Jin | G06F 3/04886 715/784 |
| 2014/0137144 A1* | 5/2014 | Jarvenpaa | H04N 21/4667 725/13 |
| 2015/0012537 A1* | 1/2015 | Yi | G06F 17/30598 707/737 |
| 2016/0014446 A1* | 1/2016 | Li | H04N 21/42209 725/40 |

\* cited by examiner

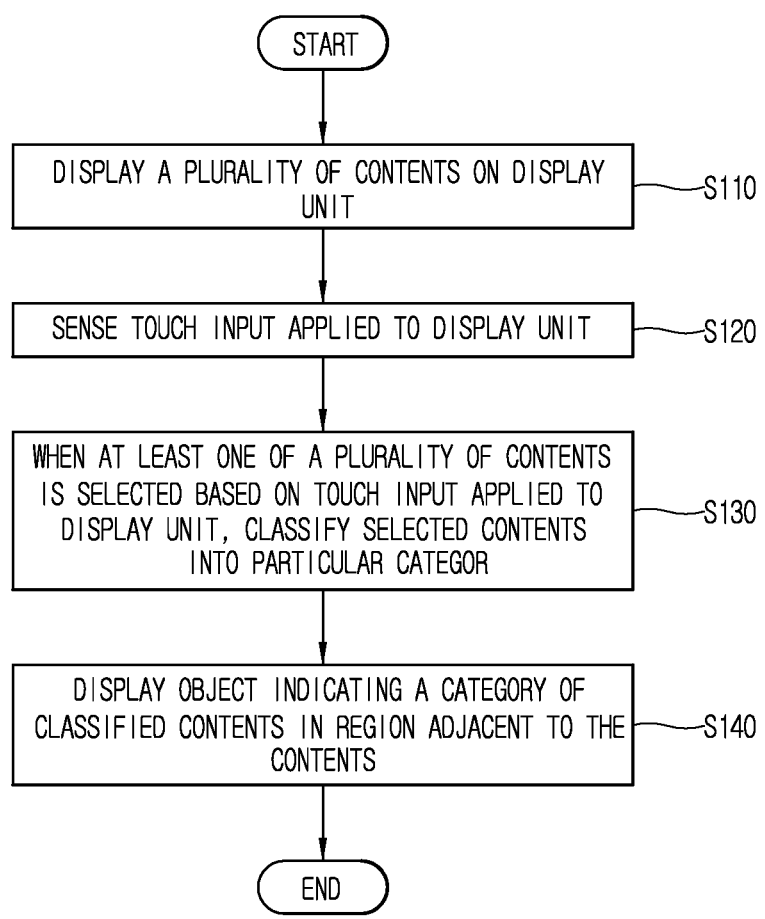

FIG. 4
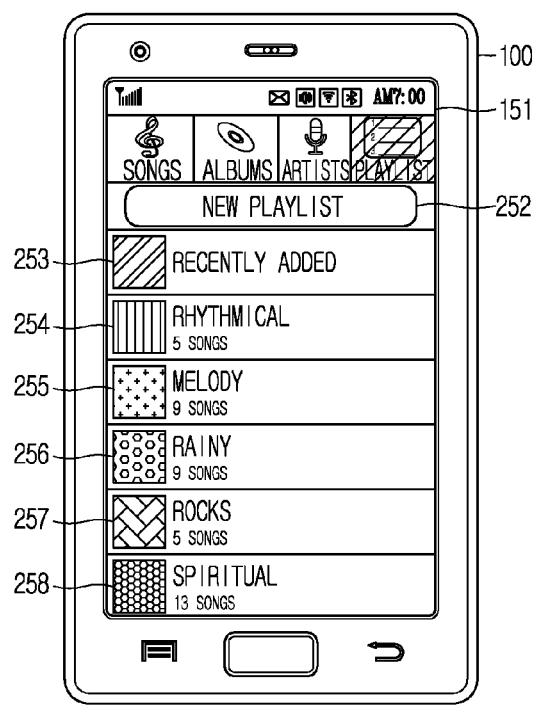
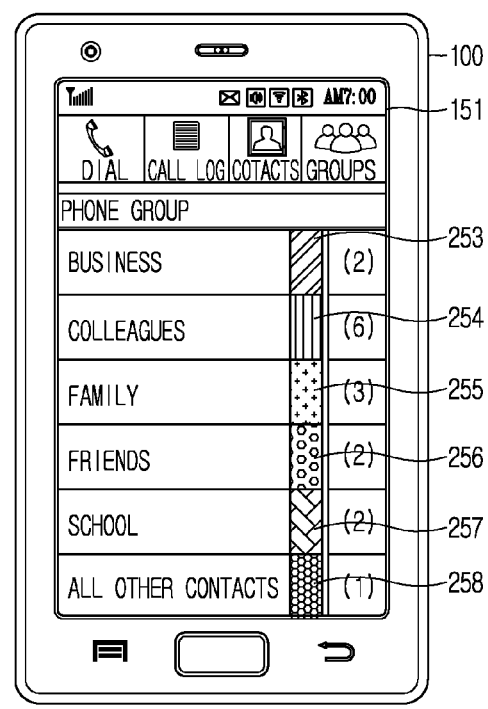
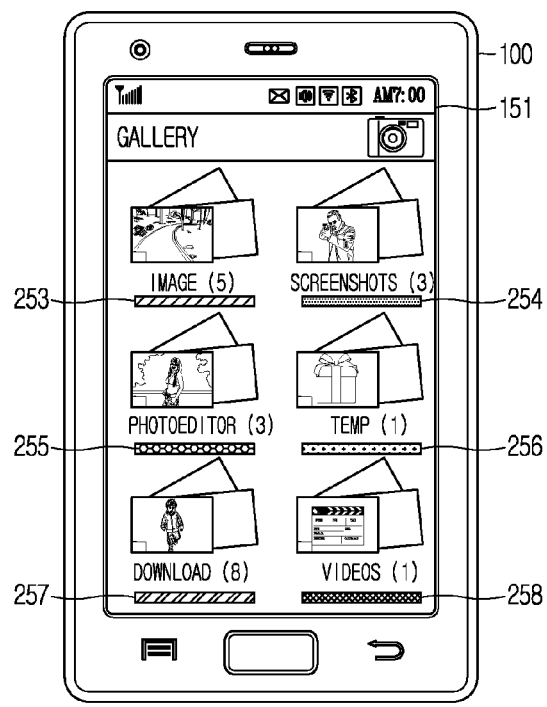

FIG. 7
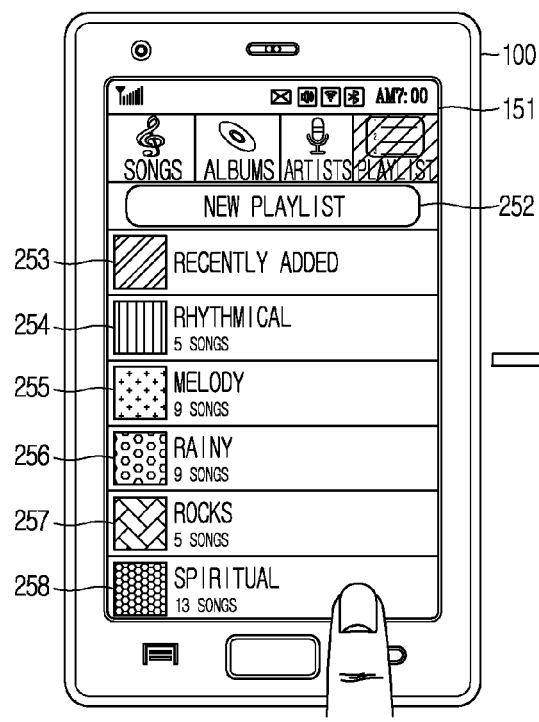
(a)
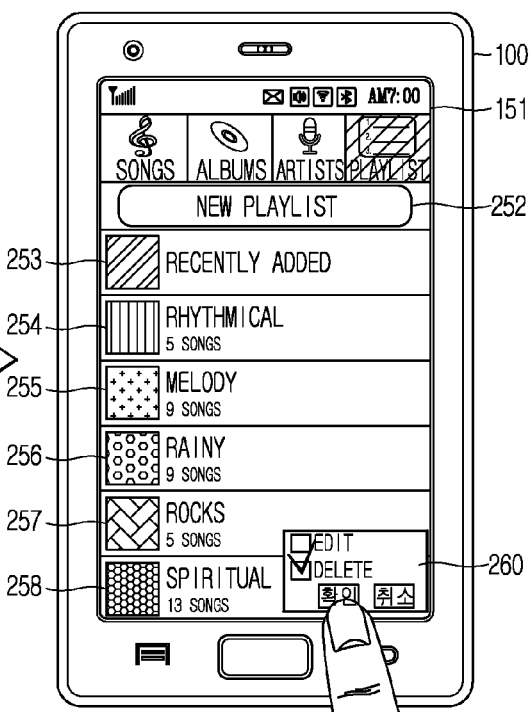
(b)
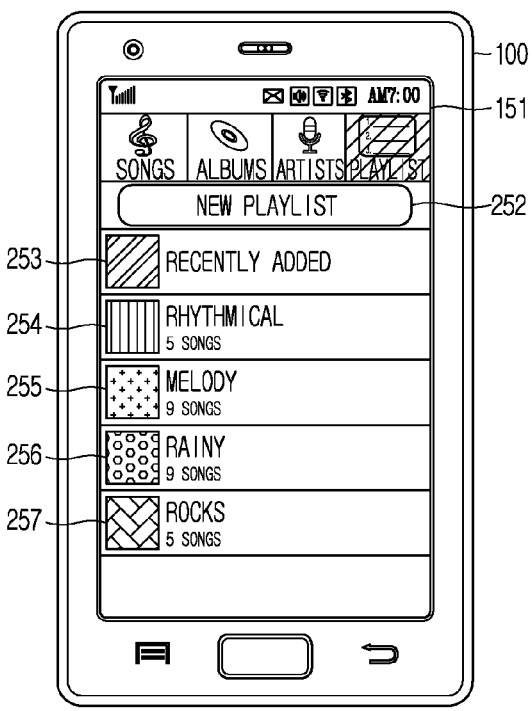
(c)

FIG. 8
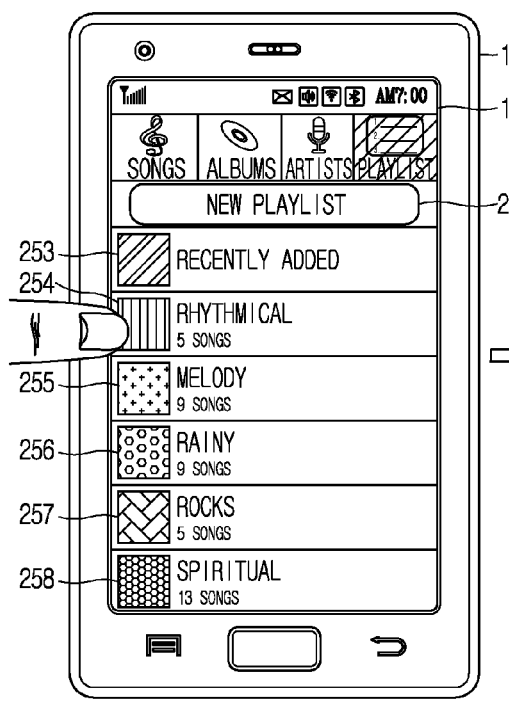
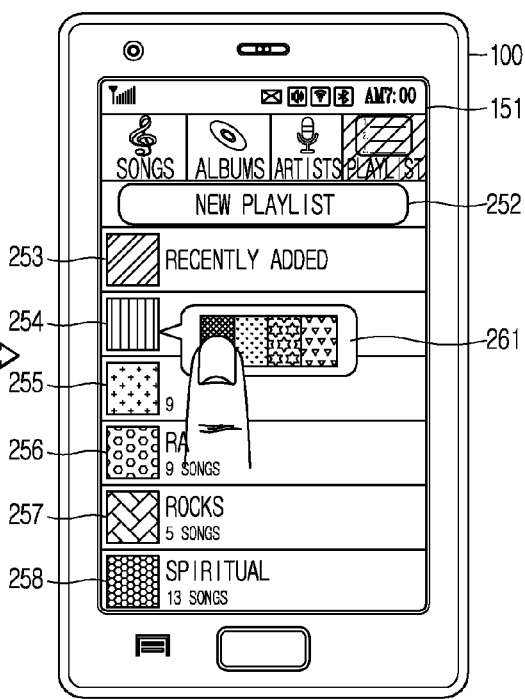
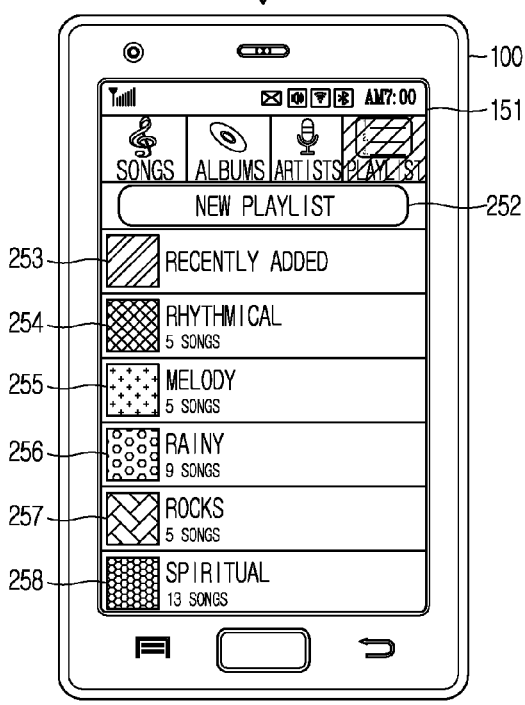

FIG. 9
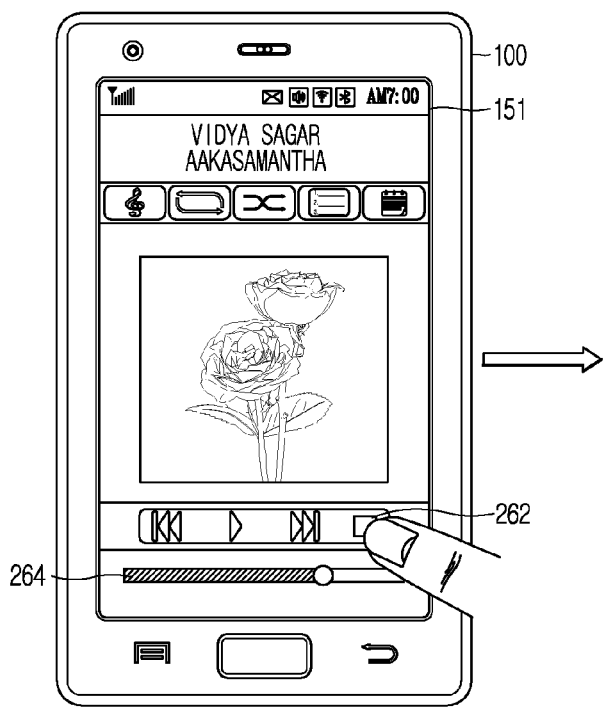
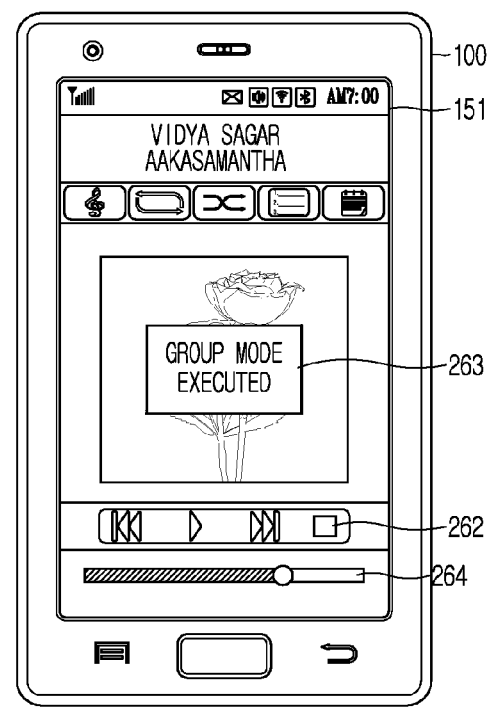

FIG. 10
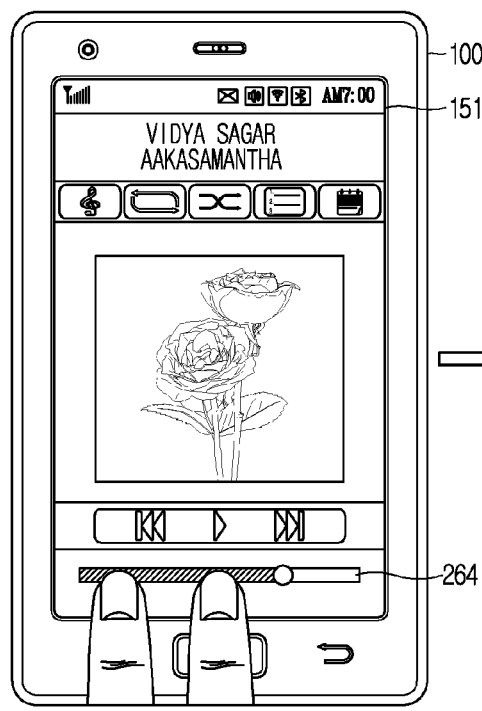
(a)
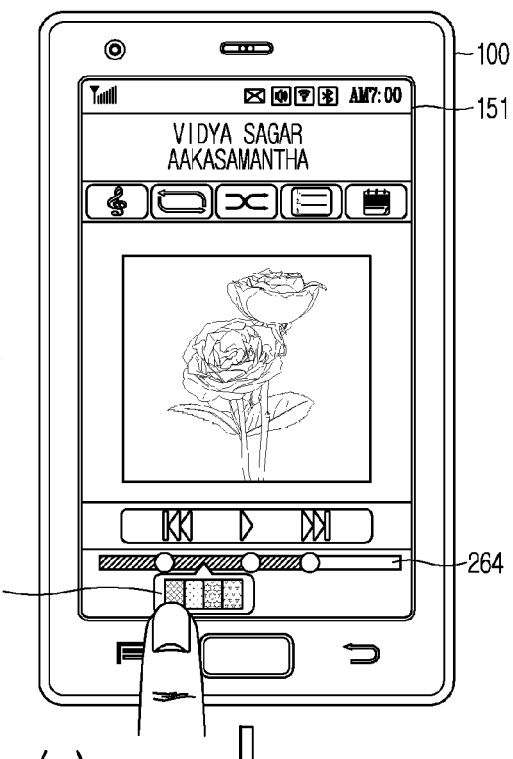
(b)
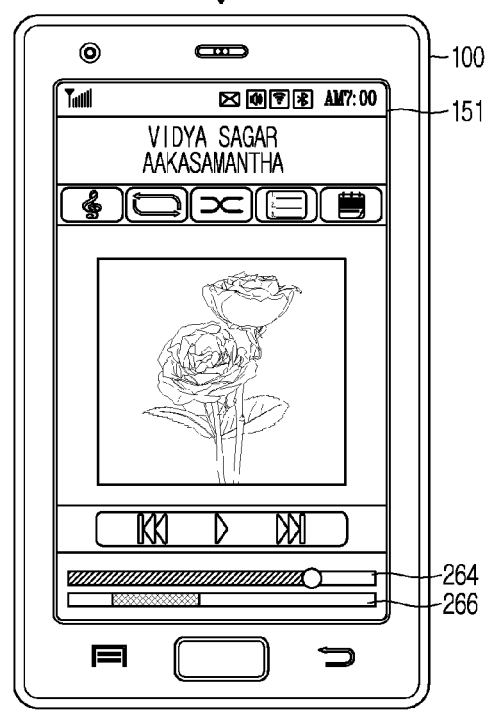
(c)

FIG. 11
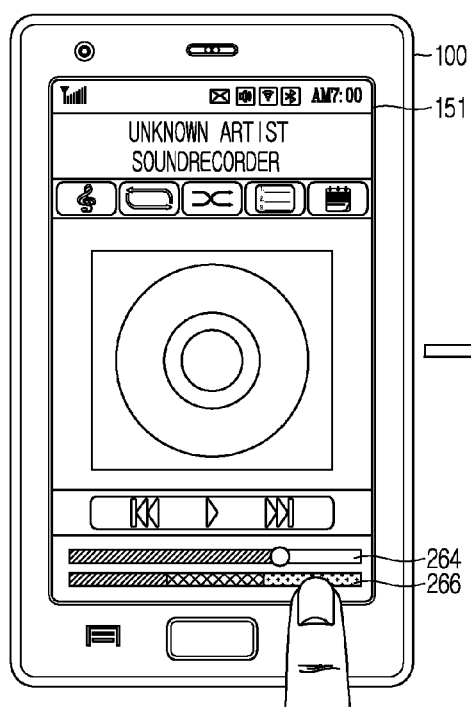
(a)
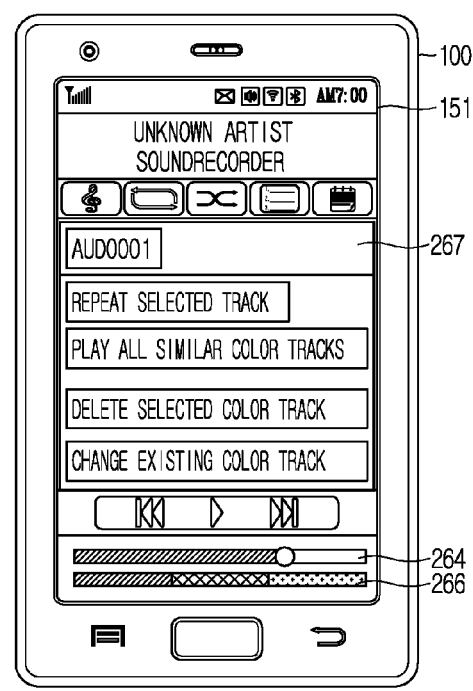
(b)

FIG. 12
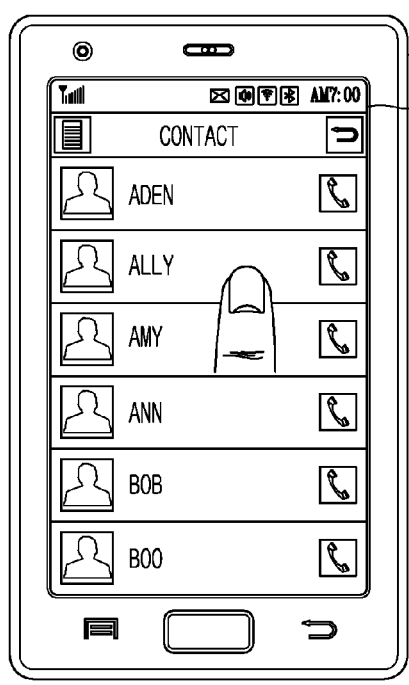
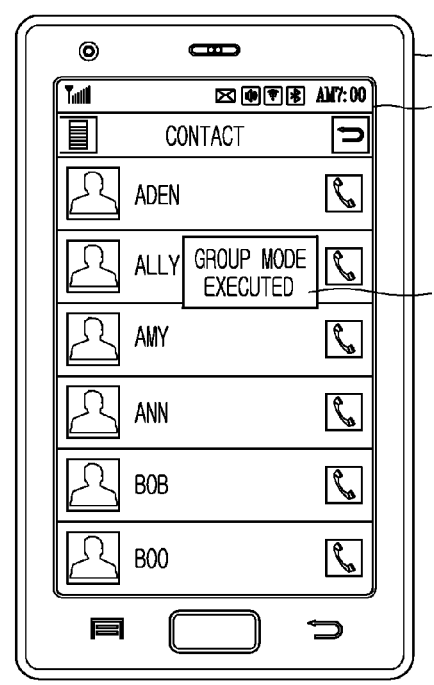
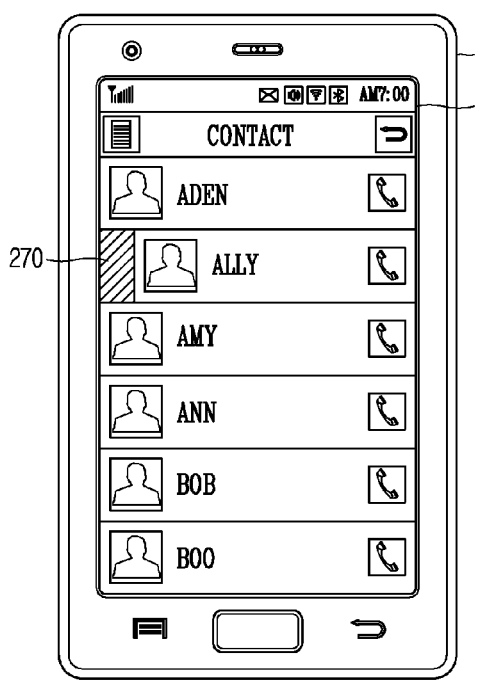
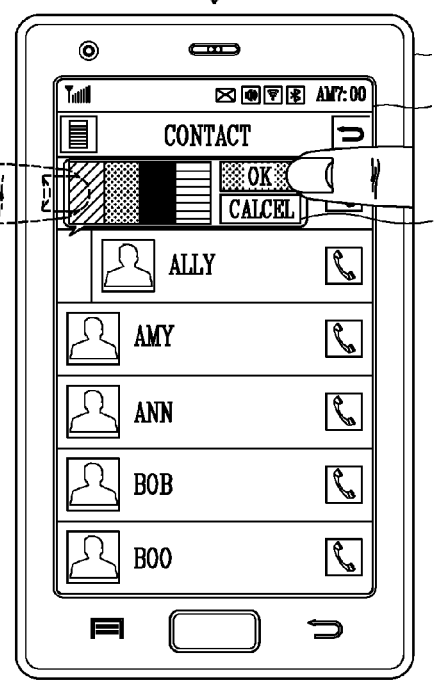

FIG. 13
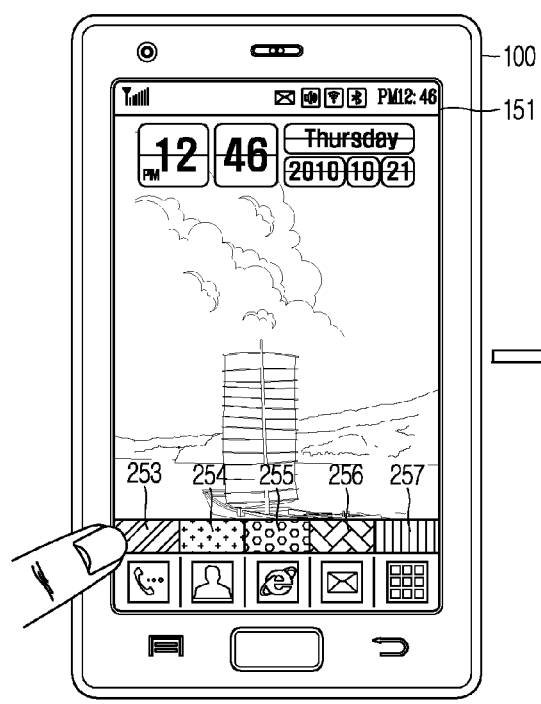
(a)
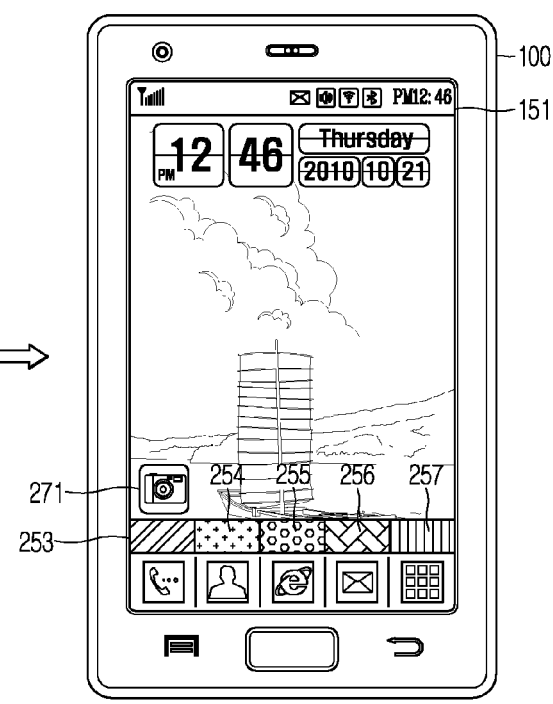
(b)

FIG. 14
(a) 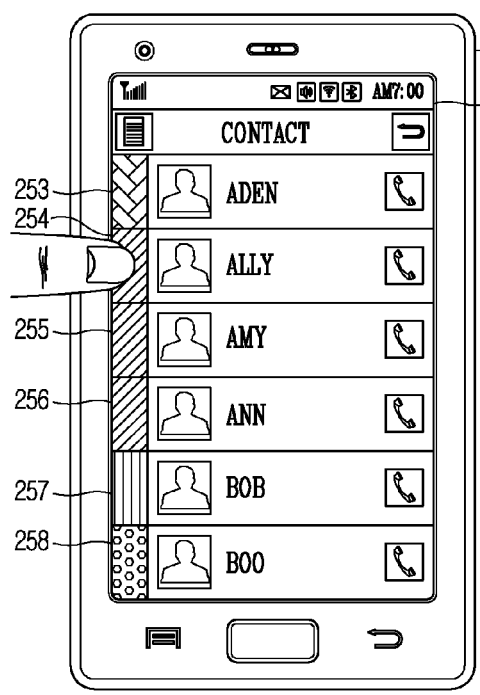
(b) 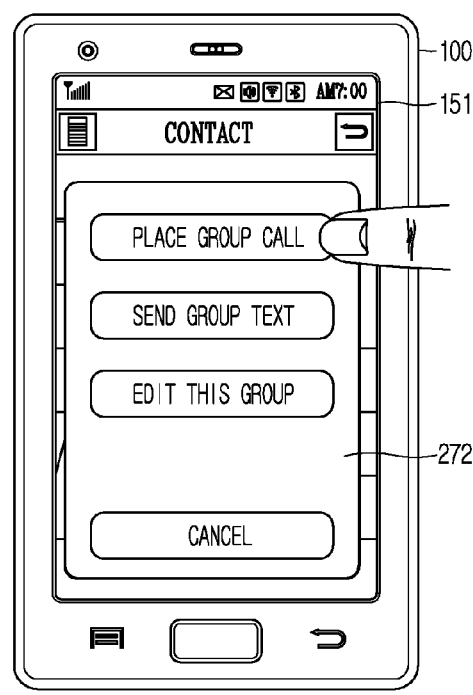
(c) 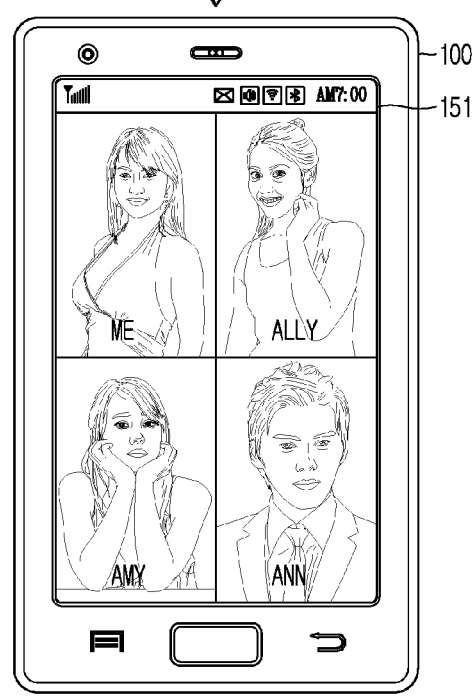

FIG. 15

| MUSIC MOOD OR BEHAVIOR PARAMETERS/ GALLERY FOLDER NAMES | HAPPY, ROMANTIC, LOVE | CALM, RELAXED | LIVELY, ACTIVE | DYNAMIC, ENERGIZED, ROCKING | TRUST, CONFIDENCE, OPTIMISTIC | SPARE TIME | BORED, SADNESS, TENSION |
|---|---|---|---|---|---|---|---|
| SCREENSHOTS | ✓ | | | | | | |
| TEMP | | ✓ | | | | | |
| VIDEOS | | | ✓ | | | | |
| IMAGE | | | | ✓ | | | |
| DOWNLOAD | | | | | ✓ | | |
| BLUETOOTH | | | | | | ✓ | |
| PHOTO EDITOR | | | | | | | ✓ |

FIG. 16
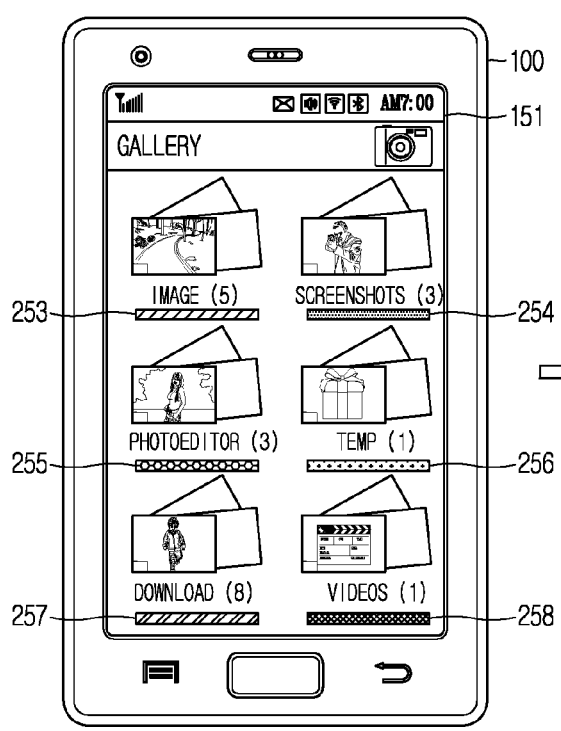
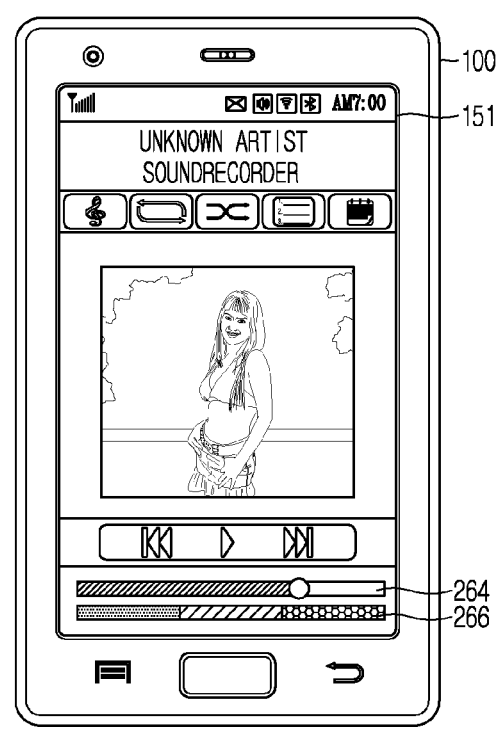

MOBILE TERMINAL AND CONTROL METHOD THEREOF

CROSS REFERENCE TO RELATED APPLICATIONS

Pursuant to 35 U.S.C. §119(a), this application claims the benefit of earlier filing date and right of priority to Korean Application No. 10-2012-0129789, filed on Nov. 15, 2012, the contents of which is incorporated by reference herein in its entirety.

BACKGROUND OF THE INVENTION

Field of the Invention

The present invention relates to a mobile terminal and, more particularly, to a mobile terminal capable of classifying contents and a control method thereof.

Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components which form the mobile terminal.

Supported by such improvements, terminals may output contents. A terminal may display a list of contents and a user may select contents desired to be output from the list. Also, the user may classify contents according to category in order to easily search for desired contents among a plurality of contents.

However, when the user classifies portions of a plurality of respective contents, it is difficult for the user to recognize which portions of the plurality of respective contents have been classified, easily at a time.

SUMMARY OF THE INVENTION

As aspect of the present invention provides a mobile terminal capable of effectively displaying a category of classified contents, and a control method thereof.

To achieve these and other advantages and in accordance with the purpose of the present invention, as embodied and broadly described herein, the present invention provides in one aspect a mobile terminal including: a display unit configured to display a plurality of contents; a touch sensor configured to sense a touch input applied to the display unit; and a controller configured to classify at least one contents selected from among a plurality of contents on the basis of a touch input applied to the display unit into a particular category, and display an object indicating the category of the selected contents in a region adjacent to the selected contents.

In an embodiment of the present invention, when at least one of the plurality of contents is selected, the controller may display a plurality of objects on the display unit so that a category of the selected contents can be selected.

In an embodiment of the present invention, after any one of the plurality of objects is selected, the controller may receive category information corresponding to the selected object.

In an embodiment of the present invention, the controller may display an object indicating the category of the selected contents in a file name of the selected contents.

In an embodiment of the present invention, when the contents is at least one of video contents and audio contents, the controller may display a progress bar indicating a degree of progress of playback of contents, and display an object indicating a category of a partial section of the selected contents on the progress bar.

In an embodiment of the present invention, the display unit may display a category list, and the controller may display the number of contents classified into categories corresponding to the objects, respectively, together with the objects.

In an embodiment of the present invention, the controller may generate priority information such that priority levels of the plurality of categories are determined, and control displaying of the objects displayed in the category list on the basis of the priority information.

In an embodiment of the present invention, when the contents is at least one of video contents and audio contents, the display unit may display a first progress bar indicating a degree of progress of playback of the contents, and when a partial section to be classified in the first progress bar is selected, the controller may display a pop-up window including the objects.

In an embodiment of the present invention, when any one of the objects included in the pop-up window is selected, the controller may classify the partial section of the contents into a category corresponding to the selected object.

In an embodiment of the present invention, the controller may display a second progress bar indicating a degree of progress of playback with respect to at least one partial section selected from the contents, in a position adjacent to the first progress bar.

In an embodiment of the present invention, when the second progress bar indicates a degree of progress of playback with respect to a plurality of partial sections, the controller may display objects corresponding to the plurality of partial sections, respectively, in the second progress bar in an overlapping manner.

In an embodiment of the present invention, when any one of the objects displayed in the second progress bar in an overlapping manner is selected, the controller may display a pop-up window for controlling or editing a group corresponding to the selected object.

In an embodiment of the present invention, the display unit may display the objects on a home screen, and when at least one of the objects displayed on the home screen is selected, the controller may select a group of an application corresponding to the selected object, and display icons corresponding to applications included in the selected group on the home screen.

In an embodiment of the present invention, when at least one of the objects is selected, the controller may select a contact group corresponding to the selected object and perform a group call with a plurality of counterparts included in the selected group.

In an embodiment of the present invention, when a group corresponding to the selected object is one of contents groups having a first file format and one of contents groups having a second file format different from the first file format, the controller may output contents in the first file format included in the group corresponding to the selected group and simultaneously output contents in the second file format included in the group corresponding to the selected object together.

In an embodiment of the present invention, at least one of color, shape, size, thickness, transparency, and 3D depth value of the objects may be different.

To achieve these and other advantages and in accordance with the purpose of the present invention, as embodied and broadly described herein, the present invention provides in another aspect a control method of a mobile terminal, including: displaying a plurality of contents on a display unit; sensing a touch input applied to the display unit; when at least one of the plurality of contents is selected on the basis of the touch input applied to the display unit, classifying the selected contents into a particular category; and displaying an object indicating the category of the selected contents in a region adjacent to the selected contents.

In an embodiment of the present invention, the classifying of the selected contents into a particular category when at least one of the plurality of contents is selected on the basis of the touch input applied to the display unit, may include: when at least one of the plurality of contents is selected, displaying the plurality of objects on the display unit such that a category for classifying the selected contents is selected.

In an embodiment of the present invention, the control method may further include: after any one of the plurality of objects is selected, receiving category information corresponding to the selected object.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 3 is a flow chart illustrating a process of the mobile terminal according to an embodiment of the present invention;

FIG. 4 is a conceptual view illustrating a category list of contents;

FIGS. 6 through 8 are conceptual views illustrating a user interface for adding a new category in the category list of contents;

FIGS. 9 and 10 are conceptual views illustrating a user interface for classifying a partial section of contents being reproduced;

FIG. 11 is a conceptual view illustrating a user interface for controlling a classified partial section of contents being reproduced;

FIG. 12 is a conceptual view illustrating a user interface for classifying at least one of a plurality of contents;

FIG. 13 is a conceptual view illustrating an operational example of application contents in FIG. 3;

FIG. 14 is a conceptual view illustrating an operational example of contact (i.e., a contact number, contact information, or the like) contents in FIG. 3; and FIGS. 15 and 16 are conceptual views illustrating an operational example of image contents in FIG. 3.

DETAILED DESCRIPTION OF THE INVENTION

Figure 1:
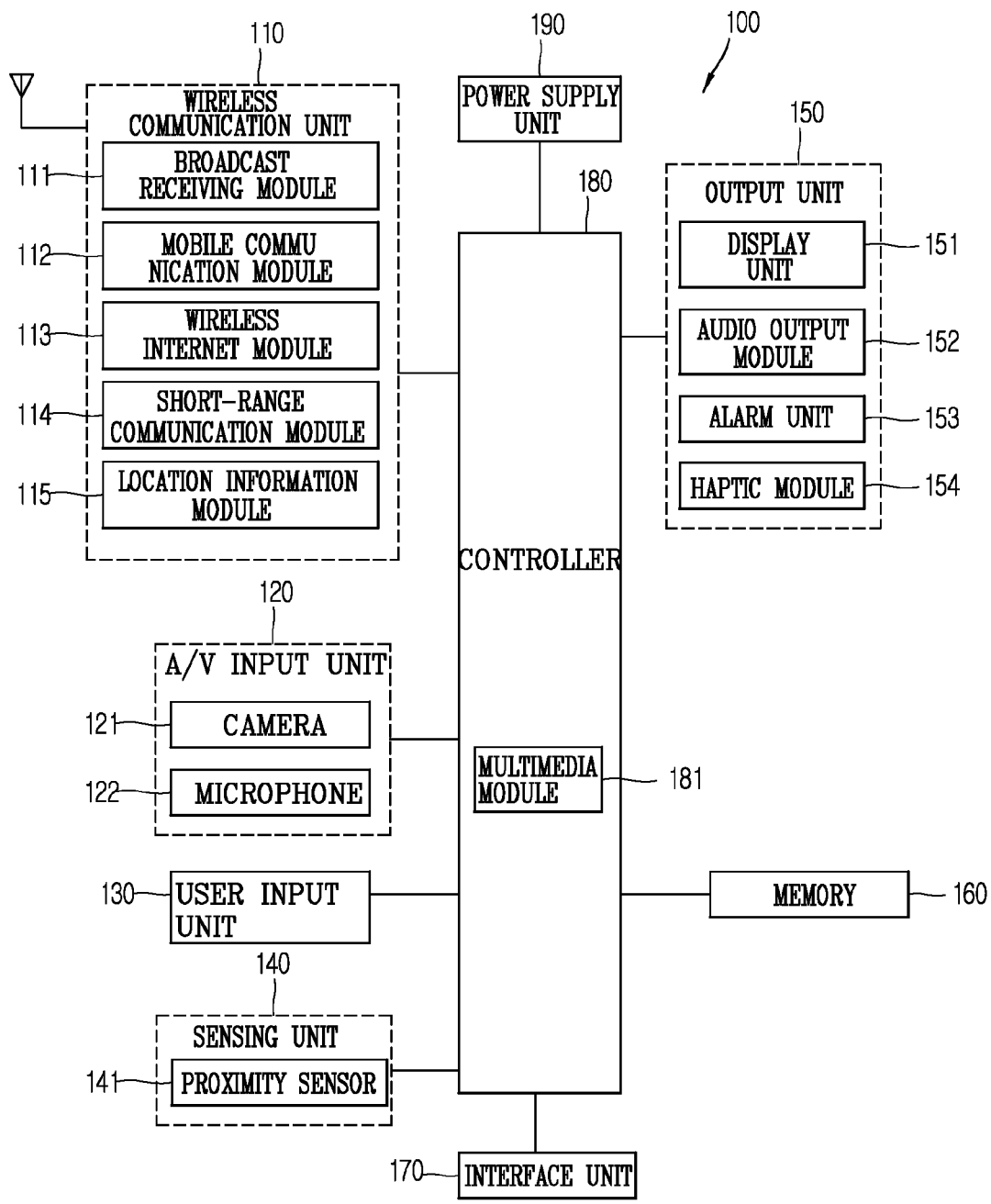
FIG. 1 is a block diagram of a mobile terminal according to an embodiment of the present invention.

Hereinafter, embodiments will be described in detail with reference to the accompanying drawings such that they can be easily practiced by those skilled in the art to which the present invention pertains. However, the present invention may be implemented in various forms and not limited to the embodiments disclosed hereinafter. Also, in order to clarify the present invention, parts irrespective of description will be omitted, and similar reference numerals are used for the similar parts throughout the specification.

Mobile terminals described in the present disclosure may include mobile phones, smart phones, notebook computers, digital broadcast terminals, PDAs (Personal Digital Assistants), PMPs (Portable Multimedia Player), navigation devices, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

FIG. 1 is a block diagram of a mobile terminal 100 according to an embodiment of the present invention.

With reference to FIG. 1, the mobile terminal 100 includes a wireless communication unit 110, an A/V (Audio/Video) input unit (referred to as a 'user tracking unit', hereinafter) 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

Hereinafter, the elements 110 to 190 of the mobile terminal 100 will be described in detail as follows.

The wireless communication unit 110 typically includes one or more modules allowing for radio communication between the mobile terminal 100 and a wireless communication system or between the mobile terminal 100 and a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal, and a server. Such radio signals may include a voice call signal, a video call signal or various types of data according to text and/or multimedia message transmission and/or reception.

The wireless Internet module 113 supports wireless Internet access for the mobile terminal 100. This module may be internally or externally coupled to the mobile terminal 100. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location of the mobile terminal 100. A typical example of the location information module is a GPS (Global Positioning System).

With reference to FIG. 1, the A/V input unit 120 may include a camera 121 and a microphone 122. The camera 121 processes image frames of still pictures or video obtained by an image sensor in a video capturing mode or an image capturing mode. The image frames processed by the camera 121 may be displayed on a display unit 151. The processed image frames may be stored in the memory 160 or transmitted to the outside via the wireless communication unit 110. Two or more cameras 121 may be provided according to a usage environment.

The microphone 122 may process an audio signal input from an external source into electrical voice data in a phone call mode, a recording mode, a voice recognition mode, and the like. The audio (voice) data processed by the microphone 122 may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. Also, the sensing unit 140 may include a touch sensor (not shown) for sensing a touch operation with respect to the display unit 151.

The touch sensor may have a form of a touch film, a touch sheet, a touch pad, and the like. The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When the touch sensor and the display unit 151 are overlaid in a layered manner, the display unit 151 may function as both an input device and an output device. Such a display unit 151 may also be called a 'touch screen'.

When there is a touch input through the touch screen, a corresponding signal (signals) are transmitted to a touch controller. The touch controller processes the signals transmitted from the touch sensor and transmits corresponding data to the controller 180. Accordingly, the controller 180 may recognize which portion of the display unit 151 has been touched.

When the touch screen is an electrostatic type touch screen, the touch screen may detect proximity of an object (or a detection target) based on a change in an electric field according to the proximity of the object. Such a touch screen may be classified as a proximity sensor 141.

The proximity sensor 141 is a sensor for detecting the presence or absence of an object by using the force of electromagnetism or infrared rays without a physical contact. Thus, the proximity sensor 141 has a considerably longer life span compared with a contact type sensor, and it can be utilized for various purposes. Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like.

In the following description, for the sake of explanation, recognition of an object to be sensed positioned to be close to the touch screen will be called a 'proximity touch', while recognition of actual contacting of an object to be sensed on the touch screen will be called a 'contact touch'.

The proximity sensor 141 senses a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. A video signal or an audio signal may also be output through the display unit 151 or the audio output module 152, so the display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a method of processing a user input with respect to the mobile terminal 100 will be described.

The user input unit 130 is manipulated to receive a command for controlling the operation of the mobile terminal 100 and may include a plurality of manipulation units. The manipulation units may be generally referred to as a manipulating portion, and various methods and techniques can be employed for the manipulation portion so long as they can be operated by the user in a tactile manner.

Various types of visual information may be displayed on the display unit 151. The information may be displayed in the form of character, number, symbol, graphic, icon, etc. In order to input the information, at least one of the character, number, symbol, graphic and icon is displayed in a certain arrangement so as to be implemented in the form of a keypad. Such keypad may be so-called 'soft key'.

The display unit 151 may be operated as a whole region or may be divided into a plurality of regions and accordingly operated. In the latter case, the plurality of regions may be operation in association with each other. For example, an output window and an input window may be displayed at upper and lower portions of the display unit 151, respectively. The output window and the input window are regions allotted for outputting or inputting information, respectively. Soft keys including numbers for inputting a phone number, or the like, may be outputted to the input window. When the soft key is touched, a number corresponding to the touched soft key is displayed on the output window. When the manipulation unit is manipulated, a call connection with respect to a phone number displayed on the output window is attempted, or text displayed on the output window may be input to an application.

The display unit 151 or the touch pad may be configured to sense touch scrolling. The user may move a cursor or a pointer positioned on an entity, e.g., an icon or the like, displayed on the display unit 151 by scrolling the display unit 151 or the touch pad. In addition, when the user moves his fingers on the display unit 151 or the touch pad, a path along which the user's fingers move may be visually displayed on the display unit 151. This may be useful in editing an image displayed on the display unit 151.

One function of the terminal may be executed in case where the display unit 151 and the touch pad are touched together within a certain time range. The both touches may be clamping the terminal body with the user's thumb and index finger. The one function executed in this case may be, for example, activation or deactivation of the display unit 151 or the touch pad.

Figure 2A:
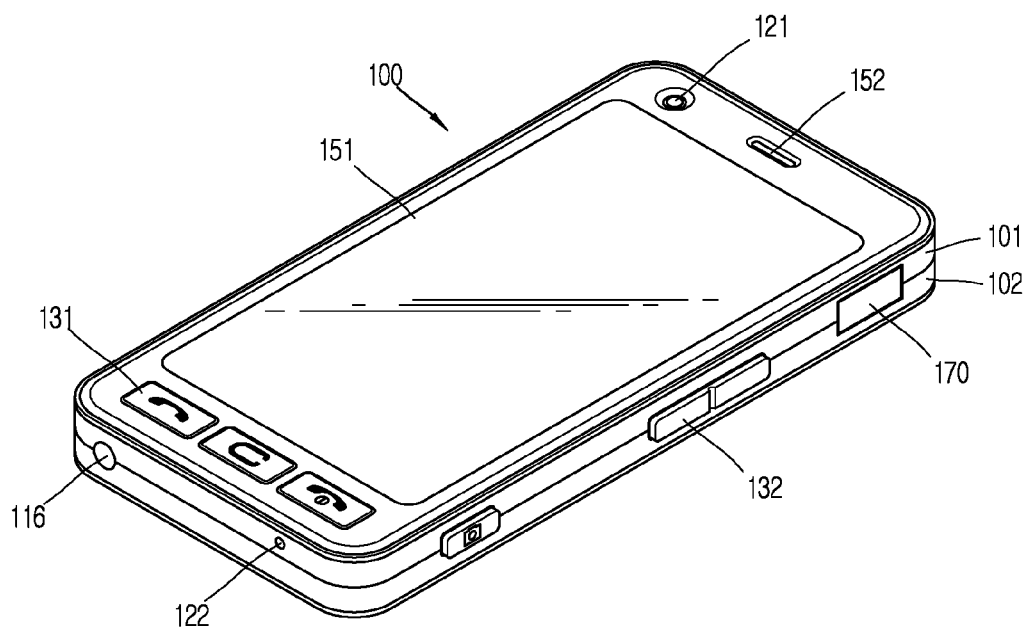
FIGS. 2A and 2B are perspective view illustrating the exterior of the mobile terminal according to an embodiment of the present invention.
Figure 2B:
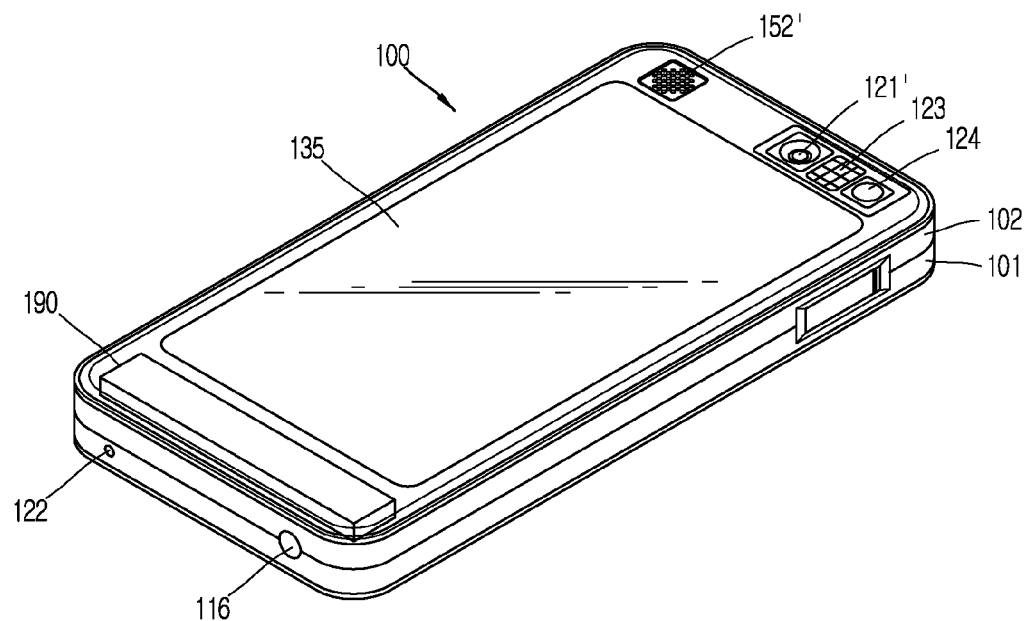

FIGS. 2A and 2B are perspective views showing an external appearance of the mobile terminal 100 according to an embodiment of the present invention. Specifically, FIG. 2A shows a front surface and one lateral surface of the mobile terminal 100, and FIG. 2B shows a rear surface and another lateral surface of the mobile terminal 100.

With reference to FIG. 2A, the mobile terminal 100 has a bar type terminal body. However, without being limited thereto, the present invention may also be applicable to a slide type mobile terminal, a folder type mobile terminal, a swing type mobile terminal, a swivel type mobile terminal, and the like, in which two or more bodies are coupled to be movable relatively.

The terminal body includes a case (or casing, housing, cover, etc.) constituting an external appearance of the terminal body. The case may be divided into a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, and the user input unit 130 (see FIG. 1), the microphone 122, the interface 170, and the like, may be located on the terminal body, namely, mainly, on the front case 101.

The display unit 151 occupies the most portion of the front surface of the front case 101. The audio output module 152 and the camera 121 are disposed at a region adjacent to one end portion of the display unit 151, and a first user input unit 131 and the microphone 122 are disposed at a region adjacent to the other end portion of the display unit 151. A second user input unit 132 and the interface 170 may be disposed on the sides of the front case 101 and the rear case 102.

The user input unit 130 is manipulated to receive commands for controlling the operation of the mobile terminal 100, and may include a plurality of manipulation units 131 and 132.

The first or second manipulation unit 131 or 132 may receive various commands. For example, the first manipulation unit may receive commands such as start, end, scroll, or the like, and the second manipulation unit 132 may receive commands such as adjustment of size of a sound outputted from the audio output module 152, conversion to a touch recognition mode of the display unit 151, and the like.

With reference to FIG. 2B, a rear camera 121' may additionally be disposed on a rear surface of the terminal body, namely, on the rear case 102. The rear camera 121' may have an image capture direction which is substantially opposite to that of the camera 121 (See FIG. 2A), and may support a different number of pixels (i.e., have a different resolution) than the front camera 121.

For example, the front camera 121 may have a relatively small number of pixels, and the rear camera 121' may have a relatively large number of pixels. Thus, the use of the front camera 121 for a video call can reduce the size of transmission data in case of capturing the user's face and transmitting the captured image to a counterpart in real time. Meanwhile, the rear camera 121' may be used for the purpose of storing a high quality image.

Meanwhile, the cameras 121 and 121' may be installed on the terminal such that they are rotated or popped up.

A flash 123 and a mirror 124 may be additionally disposed adjacent to the camera 121'. When the user captures an image of the subject with the rear camera 121', the flash 123 illuminates the subject. The mirror 124 allows the user to see himself when he wants to capture his own image (i.e., self-image capturing) by using the rear camera 121'.

An audio output unit 152' may be additionally disposed on the rear surface of the terminal body. The rear audio output unit 152' may implement a stereoscopic function along with the audio output module 152 (See FIG. 2A), and may be used for implementing a speaker phone mode during call communication.

A broadcast signal receiving antenna 116 may be additionally disposed on the side of the terminal body in addition to an antenna that supports call communications. The antenna 116 forming a portion of the broadcast reception module 111 (See FIG. 1) may be installed to be drawn out of the terminal body.

A power supply unit 190 for supplying power to the mobile terminal 100 may be installed on the terminal body. The power supply unit 190 may be installed in the terminal body or may be directly detached from the outside of the terminal body.

A touch pad 135 for detecting a touch may be additionally mounted on the rear case 102. Such touch pad may be configured to be light-transmissive like the display unit 151 (See FIG. 2A). Also, a rear display unit may be additionally mounted on the touch pad 135 in order to output visual information. In this case, information output from both of the front display unit 151 and the rear display unit may be controlled by the touch pad 135.

The touch pad 135 is operated in relation to the display unit 151. The touch pad 135 may be disposed to be parallel to the rear side of the display unit 151. The touch pad 135 may have the same size as or smaller than the display unit 151.

Supported by such improvements, terminals may output contents. The mobile terminal 100 may display a list of contents and a user may select contents desired to be output from the list. Also, the user may classify contents according to category in order to easily search for desired contents among a plurality of contents. However, when the user classify portions of a plurality of respective contents, it is difficult for the user to recognize which portions of the plurality of respective contents have been classified, easily at a time.

Thus, hereinafter, a mobile terminal 100 capable of effectively displaying a category of contents, and a control method thereof will be described with reference to the accompanying drawings.

FIG. 3 is a flow chart illustrating a process of the mobile terminal 100 (please see FIG. 1) according to an embodiment of the present invention. The mobile terminal 100 includes the display unit 151 (please see FIG. 1) and the controller 180 (please see FIG. 1).

Referring to FIG. 3, first, a plurality of contents are displayed on the display unit 151 in step S110.

The display unit 151 may display contents. Here, contents refer to various types of information or content thereof output through the mobile terminal 100, a computer, or the like. Contents may be provided to the mobile terminal 100, a computer, or the like, through the Internet, computer communication, or the like. Contents may include multimedia information such as a sound, an image, and the like, as well as text.

Next, a touch input applied to the display unit 151 is sensed in step S120.

A touch sensor (not shown) may have a form of a touch film, a touch sheet, a touch pad, or the like. The touch sensor may be configured to convert pressure applied to a particular portion of the display unit 151 or a change in capacitance generated in a particular portion of the display unit 151 into an electrical input signal. The touch sensor may be configured to detect even a touch pressure, as well as a touched position and a touched area.

According to an embodiment of the present invention, the touch sensor and the display unit 151 may be overlaid in a layered manner. In this case, the display unit 151 may function as both an input device and an output device. Such a display unit 151 may be called a 'touch screen'.

Thereafter, when at least one of a plurality of contents is selected on the basis of a touch input applied to the display unit 151, the selected contents is classified into a particular category in step S130.

In detail, on the basis of a touch input sensed on the touch sensor, one of contents may be selected or two or more contents may be selected. Here, the touch input may include at least one of a single tap gesture, a double tap gesture, a drag gesture, a flick gesture, a pinch-in gesture, and a pinch-out gesture.

The controller 180 may classify the selected contents into a particular category. The controller 180 may display objects corresponding to a plurality of respective categories on the display unit 151. Here, the objects may include at least one of an icon, a thumbnail image, and a color code. The objects may be different in at least one of color, shape, size, thickness, transparency, and three-dimensional (3D) depth value.

The objects corresponding to the plurality of respective categories may be displayed as pop-up windows on the display unit 151. The pop-up windows may overlap with contents and transparency of the pop-up windows may be adjusted such that they do not cover the contents.

Meanwhile, the objects may be displayed in regions different from a region in which contents is displayed. For example, when contents is selected, the controller 180 may divide the display unit 151 into first and second screen regions. The controller 180 may display contents in the first screen region and display objects in the second screen region.

At least one of objects displayed on the display unit 151 may be selected. In detail, one of the objects may be selected, or two or more of them may be selected. The controller 180 may sense an object to which a touch input has been applied, among objects displayed on the display unit 151, and select a category corresponding to the sensed object.

Thereafter, the object indicating the category of the classified contents is displayed in a region adjacent to the selected contents in step S140 (It can be recognized that the selected contents has been classified into the corresponding category through the object).

The controller 180 may display contents. The controller 180 may display a plurality of contents on a single screen. Also, the controller 180 may display a list of a plurality of contents.

The controller 180 may display the object corresponding to the category of the classified contents in an overlapping manner on the contents or may display the object in a position adjacent to the contents. The object may include icons having colors corresponding to a plurality of respective categories. Also, as mentioned above, the object may include an icon having a shape, a size, a thickness, and transparency, besides the colors corresponding to the plurality of respective categories.

For example, in a case in which contents is at least one of video contents and audio contents, the display unit 151 may display a first progress bar indicating a degree of progress of playback of the contents. When a partial section to be classified in the first progress bar is selected, the controller 180 may display a pop-up window including objects.

When any one of the objects is selected in the pop-up window, the controller 180 may classify the selected partial section into a category corresponding to the selected object. And then, the controller 180 may display the object in the selected partial section of the first progress bar in an overlapping manner, in order to indicate the fact that the selected partial section has been classified into a category corresponding to the selected object.

Meanwhile, the controller 180 may generate a second progress bar indicating a progress degree of only the selected partial section, and may display the object in the second progress bar in an overlapping manner.

When a plurality of partial sections have been classified into a plurality of categories, the controller 180 may display a plurality of the same or different objects in a plurality of partial sections of the first progress bar in an overlapping manner. Also, the controller 180 may display a plurality of the same or different objects in the second progress bar indicating a degree of progress of playback of only the plurality of partial sections in an overlapping manner.

As described above, according to an embodiment of the present invention, since the object as an indicator indicating the category of the contents is displayed together with the contents, a user may view or recognize categories of classified contents and categories of classified portions of contents at a glance. Thus, an error of a user input in a process of checking a category including classified contents can be reduced. As a result, user convenience can be enhanced.

FIG. 4 is a conceptual view illustrating a list of categories of contents. The mobile terminal 100 includes the display unit 151 and the controller 180 (please see FIG. 1).

Referring to FIG. 4, the display unit 151 may display a plurality of objects corresponding to a plurality of categories in a category list. As illustrated, the controller 180 may display names of the plurality of categories together with objects corresponding to the plurality of categories. Also, the controller 180 may display the amount of contents included in each of the plurality of categories together with the objects.

Category items included in the category list may be displayed in various order. The controller 180 may generate priority information such that priority levels of a plurality of categories are determined, and control displaying of category items displayed in the category list. Namely, the controller 180 may preferentially dispose a category item having the highest priority level. Also, the controller 180 may display an object corresponding to the category item having the highest priority level such that it is larger than other objects.

Referring to FIG. 4(a), the display unit 151 may display a category list of music contents. As illustrated, the category list may include objects 253 to 258 corresponding to a plurality of categories of music contents. The controller 180 may classify a plurality of music contents by genre or by atmosphere according to a user selection. Also, the controller 180 may classify a portion of music contents.

The objects 253 to 258 may include icons each having a color corresponding to each of the plurality of categories. Although not shown, the objects 253 to 258 may include icons denoting characteristics of the plurality of categories. For example, the objects 253 to 258 may include icons denoting a genre or an atmosphere of music contents.

The display unit 151 may display an icon 252 for generating a new category. When the icon 252 is selected, the controller 180 may display a screen for selecting a name of a new category and an object corresponding to the new category on the display unit 151. Details thereof will be described later with reference to FIG. 6.

Referring to FIG. 4(b), the display unit 151 may display a category list of contact (i.e., contact number, contact information, or the like) contents. As illustrated, the controller 180 may classify contact contents on the basis of relationships between the user and counterparts corresponding to the contact contents. The contact contents may be classified on the basis of a user selection or may be classified on the basis of determination of the controller 180.

Referring to FIG. 4(c), the display unit 151 may display a category list of image contents. As illustrated, the controller 180 may classify image contents on the basis of image obtaining paths. Although not shown, the controller 180 may classify image contents on the basis of attribute information regarding an image, a subject included in an image, and the like.

Figure 5:
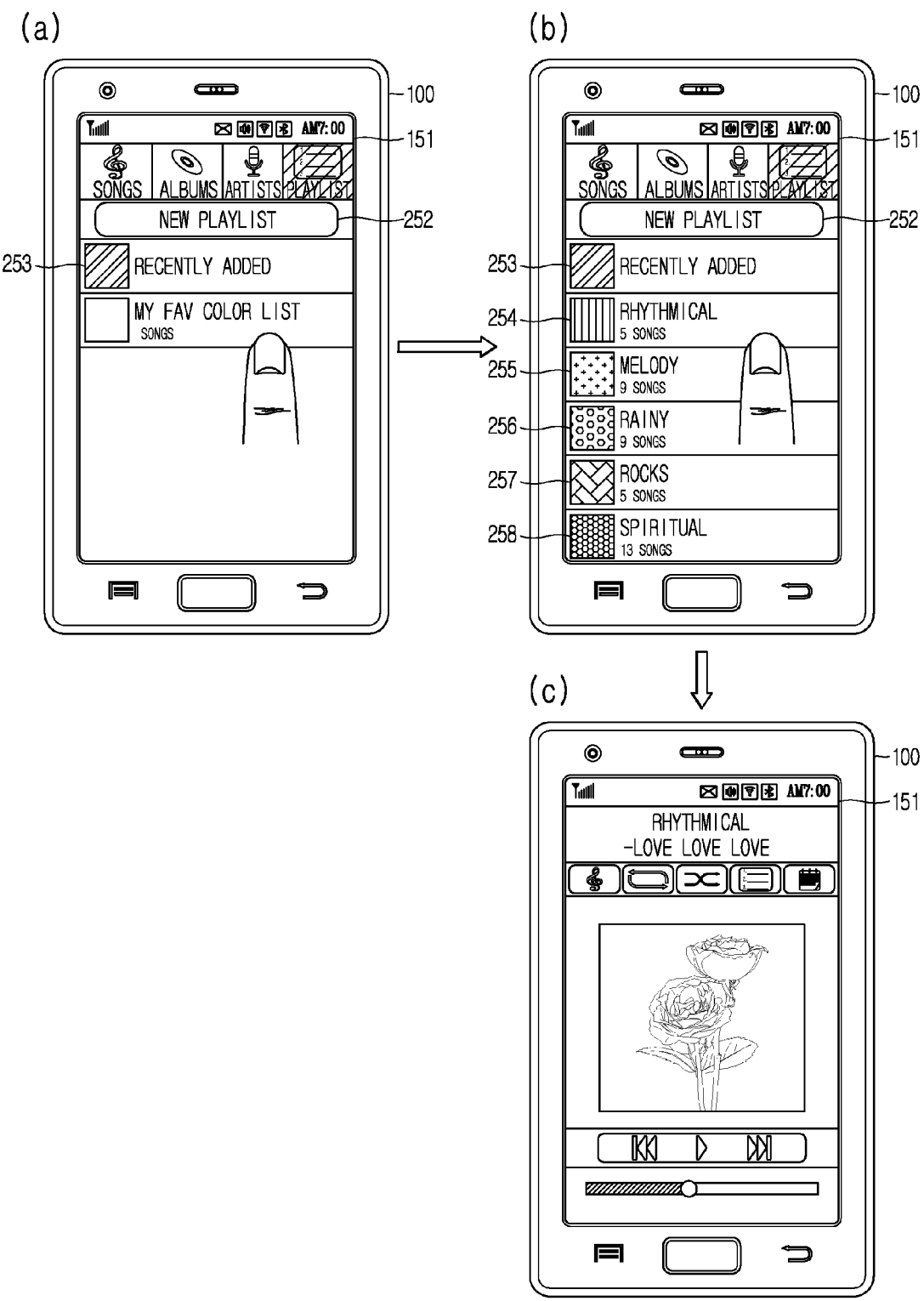
FIG. 5 is a conceptual view illustrating a user interface for outputting contents included in a category selected from the category list.

FIG. 5 is a conceptual view illustrating a user interface for outputting contents included in a category selected from the category list. The mobile terminal 100 includes the display unit 151 and the controller 180 (please see FIG. 1).

Referring to FIG. 5, the display unit 151 may display a category list of music contents. The controller 180 may select a category corresponding to an object selected from among the objects 253 to 258 included in the category list, and output contents included in the selected category.

In detail, referring to FIGS. 5(a) and 5(b), when a menu item for displaying a category list of music contents is selected, the controller 180 may display a category list of music contents on the display unit 151. As illustrated, the category list may include the objects 253 to 258 corresponding to a plurality of categories of music contents. Also, as illustrated, a name of the plurality of categories and the amount of contents included in each of the plurality of categories may be displayed, together with the objects 253 to 258.

In this case, when any one of category items, e.g., "Rhythmical" category item, is selected from the category list, the controller 180 may output contents included in the selected category item as illustrated in FIG. 5(c). The display unit 151 may display notification information indicating that the contents included in the selected category item are being output. For example, as illustrated, the display unit 151 may display a name of the selected category item.

Figure 6:
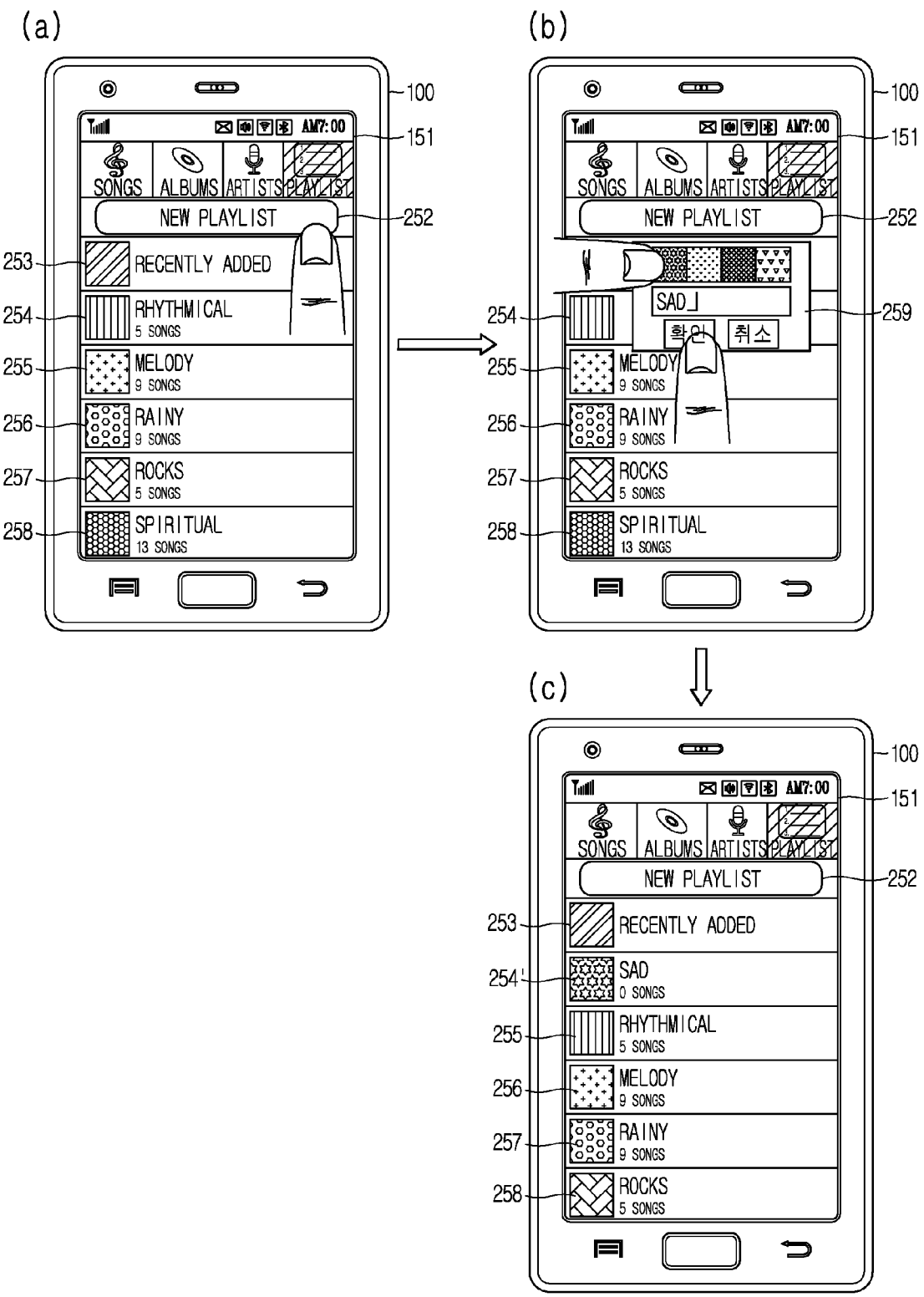

FIGS. 6 through 8 are conceptual views illustrating a user interface for adding a new category in the category list of contents. The mobile terminal 100 includes the display unit 151 and the controller 180 (please see FIG. 1).

Referring to FIG. 6, the controller 180 may generate a new category. In detail, as illustrated in FIG. 6(a), the display unit 151 may display an icon 252 for generating a new category.

When the icon 252 is selected, as illustrated in FIG. 6(b), the controller 180 may display a screen 259 allowing a user to select a category name of a new category and an object corresponding to the new category on the display unit 151.

When a name of the new category is input and an object is selected, as illustrated in FIG. 6(c), the controller 180 may add a new category item to the category list. Accordingly, an object 254' corresponding to the new category item may be displayed on the display unit 151.

Referring to FIG. 7, the controller 180 may edit or delete a category item included in the category list. In detail, when a touch input applied to any one of the category items displayed on the display unit 151 is sensed as illustrated in FIG. 7(a), the controller 180 may display a pop-up window 260 in which whether to edit or delete a category item can be selected, as illustrated in FIG. 7(b).

For example, when a deletion item is selected in the pop-up window 260, as illustrated in FIG. 7(c), the controller 180 may detect a category item to which a touch input is applied, and delete the detected category item. Thus, as the category item is deleted, the corresponding category item disappears from the display unit 151.

Referring to FIG. 8, the controller 180 may edit an object included in the category list. In detail, when an touch input applied to any one 254 of the objects 253 to 258 displayed on the display unit 151 is sensed as illustrated in FIG. 8(a), the controller 180 may display a pop-up window for changing the touched object 254 into a different object as illustrated in FIG. 8(b).

When an one of objects displayed in the pop-up window 261 s selected, the controller 180 may display the object selected from the pop-up window 261, as an object corresponding to a "Rhythmical" category item on the display unit 151.

FIGS. 9 and 10 are conceptual views illustrating a user interface for classifying a partial section of contents being played. The mobile terminal 100 includes the display unit 151 and the controller 180 (please see FIG. 1).

Referring to FIG. 9(a), the controller 180 may play music contents. Although not shown, the controller 180 may play video contents and audio contents. The display unit 151 may display a reproduced screen of the music contents. The reproduced screen may include a first progress bar 264 indicating a progress degree of the music contents. Also, the reproduced screen may include an icon for executing a section classification mode.

Here, the section classification mode refers to a mode in which a control command applied to the first progress bar 264 is permitted in order to classify a partial section of the music contents.

When the icon 262 for executing the section classification mode is selected, the controller may execute the section classification mode as illustrated in FIG. 9(b). Also, the controller 180 may display a pop-up window 263 indicating execution of the section classification mode on the display unit 151.

In the section classification mode, with reference to FIG. 10(a), the controller 180 may sense touch inputs applied to the first progress bar 264, as a control command for designating a partial section of the music contents. For example, the user may designate a partial section of the music contents being reproduced, by applying a touch input to first and second points of the first progress bar 264.

Next, referring to FIG. 10(b), the controller 180 may display a pop-up window 265 including a plurality of objects on the display unit 151 to allow the user to classify the designated partial section into a certain category. The objects included in the pop-up window 265 may correspond to a plurality of categories, respectively.

When any one of the objects is selected in the pop-up window 265, the designated partial section may be classified into a category (hereinafter, referred to as a 'first category') corresponding to the selected object, as illustrated in FIG. 10(c).

In this case, the controller 180 may generate a second progress bar 266 indicating a progress degree of reproduction with respect to the designated partial section. The display unit 151 may display the second progress bar 266 in a position adjacent to the first progress bar 264. Also, as illustrated, as the designated partial section is classified into a first category, the controller 180 may display an object having the same shape as that of the selected object in an overlapping manner in the second progress bar 266.

FIG. 11 is a conceptual view illustrating a user interface for controlling a classified partial section of contents being reproduced. The mobile terminal 100 includes the display unit 151 and the controller 180 (please see FIG. 1).

Referring to FIG. 11(a), the display unit display a reproduced screen of music contents. The reproduced screen may include a first progress bar 264 indicating a progress degree of reproduction of the music contents and a second progress bar 266 indicating a progress degree with respect to a designated partial section.

As illustrated, the second progress bar 266 may indicate a progress degree of reproduction with respect to a plurality of designated partial sections. In this case, objects corresponding to the plurality of respective designated partial sections may be displayed on the second progress bar 266 in an overlapping manner.

In a case in which any one of the objects displayed in the second progress bar 266 in an overlapping manner is selected, the controller 180 may display a pop-up window 267 for controlling or editing a category corresponding to the selected category, as illustrated in FIG. 11(b).

The pop-up window 267 may include a plurality of menu items. The controller 180 may play a selected partial section on the basis of a touch input applied to the menu items, and may reproduce, delete, or edit all the partial sections included in a category corresponding to a selected object.

FIG. 12 is a conceptual view illustrating a user interface for classifying at least one of a plurality of contents. The mobile terminal 100 includes the display unit 151 and the controller 180 (please see FIG. 1).

Referring to FIG. 12, the display unit 151 may display a plurality of contents. A category selecting unit 182 may classify an object selected from among a plurality of contents, into a selected category.

In detail, as illustrated in FIG. 12(a), the display unit 151 may display a contact contents list including a plurality of contact contents. Here, when any one of the plurality of contact contents is selected, the controller 180 may execute a category classification mode as illustrated in FIG. 12(b) including displaying pop-up window 268.

Here, the category classification mode refers to a mode in which a control command applied to contact contents to classify contact contents is permitted.

When the category classification mode is executed, as illustrated in FIG. 12(c), the controller 180 may display a pop-up window including a plurality of objects on the display unit 151 to allow the user to classify the selected contact contents into a certain category. The objects included in the pop-up window 269 may correspond to a plurality of categories, respectively.

When any one of the objects is selected in the pop-up window 269, with reference to FIG. 12(d), the selected contact contents may be classified into a category (hereinafter, referred to as a 'first category') corresponding to the selected object. Also, as the selected contact contents is classified into the first category, the controller 180 may display an object 270 having the same form as that of the selected object, together with the contact contents on the display unit 151.

FIG. 13 is a conceptual view illustrating an operational example of application contents in FIG. 3. The mobile terminal 100 includes the display unit 151 and the controller 180 (please see FIG. 1).

Referring to FIG. 13(a), the display unit 151 may display a home screen. The home screen may include a plurality of objects 253 to 257 corresponding to a plurality of groups (a plurality of categories), respectively. In this case, when at least one 253 of the plurality of objects 253 to 257 is selected, the controller 180 may select a group of an application corresponding to the selected object 253.

Thereafter, as illustrated in FIG. 13(b), the controller 180 may display an icon 271 corresponding to the application included in the selected group on the home screen.

FIG. 14 is a conceptual view illustrating an operational example of contact (i.e., a contact number, contact information, or the like) contents in FIG. 3. The mobile terminal 100 includes the display unit 151 and the controller 180 (please see FIG. 1).

As illustrated in FIG. 14(a), the display unit 151 may display a contact contents list including a plurality of contact contents. The contact contents list may include objects 253 to 258 corresponding to groups including a plurality of contact contents, respectively. In this case, when at least one 254 of the plurality of objects 253 to 258 is selected, the controller 180 may select a contact group corresponding to the selected object 254.

For example, three contact contents ("ALLY", "AMY", "ANN") may be included in a contact group corresponding to the selected object 254.

When the contact group is selected, as illustrated in FIG. 14(b), the controller 180 may display a pop-up window 272 for controlling or editing a group corresponding to the selected object 254.

The pop-up window 272 may display a plurality of menu items. On the basis of a touch input applied to the menu items, the controller 180 may perform a group call with counterparts included in a selected contact group, transmit group text to the counterparts, or edit the selected contact group.

For example, when a group call menu item is selected form the pop-up window 272, as illustrated in FIG. 14(c), the controller 180 may perform a group call with counterparts ("ALLY", "AMY", "ANN") included in the selected contact group. Accordingly, the display unit 151 may display a group call screen.

FIGS. 15 and 16 are conceptual views illustrating an operational example of image contents in FIG. 3. The mobile terminal 100 includes the display unit 151 and the controller 180 (please see FIG. 1).

Referring to FIG. 15, the controller may match a plurality of groups with respect to image contents and a plurality of groups with respect to music contents. For example, a screenshot image contents group and a music contents group having a happy atmosphere may be matched. Thus, an object corresponding to the screenshot image contents group and an object corresponding to the music contents group having a happy atmosphere are the same.

Namely, a group corresponding to a single object may include two groups; one (screenshot image contents group) of contents (image contents) groups having a first file format and one (music contents group having a happy atmosphere) of groups having a second file format (music contents).

FIG. 16 illustrates an operational example of image contents to which the content described above with reference to FIG. 15 is applied. In detail, referring to FIG. 16(b), the controller 180 may play music contents and the display unit 151 may display played screen of the music contents. The played screen may include a first progress bar 264 indicating a degree of progress of playback of music contents and a second progress bar 266 indicating a degree of process of playback with respect to a designated partial section.

As illustrated, the second progress bar 266 may indicate a degree of progress of playback with respect to a plurality of designated partial sections (hereinafter, referred to as "first to third partial sections"). Here, objects (hereinafter, referred to as "first to third objects") corresponding to the first to third partial sections, respectively, may be displayed in the second progress bar 266 in an overlapping manner.

Referring to the first progress bar 264 and the second progress bar 266, it can be seen that a third partial section is being played. Thus, an image included in an image contents group (a photoeditor image contents group 255 illustrated in FIG. 16(a)) corresponding to the third object may be displayed on the display unit 151.

If the first partial section is being currently played, the display unit 151 may display an image included in the image contents group (the screenshot image contents group 254 illustrated in FIG. 16(a)) corresponding to the first object.

Although not shown, the present invention may also be applied to a calendar. A plurality of event contents included in a calendar may be divided into a plurality of groups, and objects corresponding to each of the plurality of groups may be designated. Thereafter, only event contents included in a group corresponding to an object selected by the user may be displayed on the display unit 151.

Also, the present invention may also be applied to e-mail contents. A plurality of e-mail contents may be divided into a plurality of groups, and objects corresponding to each of the plurality of groups may be designated. Thereafter, only e-mail contents included in a group corresponding to an object selected by the user may be displayed on the display unit 151.

In the embodiments of the present invention, the foregoing method may be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet). The computer may include a controller of a terminal.

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   a touch screen; and
   a controller configured to:
   display a reproduced screen for a plurality of content items on the touch screen, wherein the plurality of content items include at least one of a video content item and an audio content item and the reproduced screen includes a first progress bar indicating a progress degree of reproduction for the plurality of content items;

select a content item included in the plurality of content items based on a touch input applied to the first progress bar;

display a pop-up window including a plurality of objects corresponding to different categories;

classify the content item included in the plurality of content items into a first category among the different categories when one of the plurality of objects is selected in the pop-up window, wherein the first category corresponds to the selected object;

display the selected object in a region adjacent to the first progress bar wherein the displayed object indicates that the content item is classified in the first category; and reproduce a set of content items classified in the first category when a touch input is applied to the displayed object in the region adjacent to the first progress bar, wherein the set of content items classified in the first category is reproduced in a sequential order, and the plurality of content items is different than the set of content items classified in the first category, wherein the controller displays a second progress bar indicating a degree of progress of playback with respect to the set of content items selected from the plurality of contents, in a position adjacent to the first progress bar, and wherein when any one of the objects displayed in the second progress bar in an overlapping manner is selected, the controller displays a pop-up window for controlling or editing a group corresponding to the selected object.

2. The mobile terminal of claim 1, wherein the plurality of content items includes a first set of first content items and a second set of second content items different from the first content items.

3. The mobile terminal of claim 1, wherein the touch screen displays a category list, and wherein the controller controls the touch screen to display the number of contents classified into the different categories corresponding to the plurality of objects, respectively, together with the plurality of objects.

4. The mobile terminal of claim 3, wherein the controller generates priority information wherein priority levels of the different categories are determined, and controls displaying of the objects displayed in the category list on the basis of the priority information.

5. The mobile terminal of claim 1, wherein when the second progress bar indicates a degree of progress of playback with respect to the set of content items, the controller displays objects corresponding to the different categories for the plurality of content items, respectively, in the second progress bar in an overlapping manner.

6. The mobile terminal of claim 1, wherein at least one of color, shape, size, thickness, transparency, and 3D depth value of the objects are different.

7. The mobile terminal of claim 1, wherein the controller is further configured to:

display at least one image content item classified in the first category while another content item classified in the first category is reproduced when the at least one image content item is included in the first category.

8. A control method of a mobile terminal, the method comprising:

displaying a reproduced screen for a plurality of content items on a touch screen of the mobile terminal, wherein the plurality of content items include at least one of a video content item and an audio content item and the reproduced screen includes a first progress bar indicating a progress degree of reproduction for the plurality of content items;

selecting a content item included in the plurality of content items based on a touch input applied to the first progress bar;

displaying a pop-up window including a plurality of objects corresponding to different categories;

classifying the content item included in the plurality of content items into a first category among the different categories when one of the plurality of objects is selected in the pop-up window, wherein the first category corresponds to the selected object;

displaying the selected object in a region adjacent to the first progress bar wherein the displayed object indicates that the content item is classified in the first category; and reproducing a set of content items classified in the first category when a touch input is applied to the displayed object in the region adjacent to the first progress bar, wherein the set of content items classified in the first category is reproduced in a sequential order, and the plurality of content items is different than the set of content items classified in the first category, wherein a second progress bar is displayed indicating a degree of progress of playback with respect to the set of content items selected from the plurality of contents, in a position adjacent to the first progress bar, and wherein when any one of the objects displayed in the second progress bar in an overlapping manner is selected, a pop-up window is displayed for controlling or editing a group corresponding to the selected object.

9. The control method of claim 8, wherein the plurality of content items includes a first set of first content items and a second set of second content items different from the first contents.

10. The control method of claim 8, further comprising:

displaying at least one image content item classified in the first category while another content item classified in the first category is reproduced when the at least one image content item is included in the first category.

* * * * *